United States Patent [19]

Ruggiero

[11] 4,211,309

[45] Jul. 8, 1980

[54] INVALID WALKER WITH IMPROVED BRAKE MEANS

[76] Inventor: Anthony M. Ruggiero, 1338 67th St., Brooklyn, N.Y. 11319

[21] Appl. No.: 895,548

[22] Filed: Apr. 12, 1978

[51] Int. Cl.² .............................................. F16D 63/00

[52] U.S. Cl. ..................................... 188/83; 272/70.3; 280/87.02 W; 297/5

[58] Field of Search ........................ 188/19, 22, 75, 83; 272/70.3, 70.4; 297/5, 6; 280/87.02 W

[56] References Cited

U.S. PATENT DOCUMENTS

| | | | |
|---|---|---|---|
| 257,185 | 5/1882 | Price | 272/70.3 |
| 912,165 | 2/1909 | Pike, Jr. | 188/83 X |
| 2,437,778 | 3/1948 | Ames | 297/6 |
| 3,279,567 | 10/1966 | Kempel | 272/70.3 |
| 3,422,930 | 1/1969 | Barron | 188/19 X |
| 3,666,057 | 5/1972 | Leifer et al. | 188/83 X |

*Primary Examiner*—George E. A. Halvosa
*Attorney, Agent, or Firm*—Auslander & Thomas

[57] ABSTRACT

An invalid walker includes a frame having a plurality of support points. A wheel is secured to the frame at each of the support points. A brake is connected to each wheel and includes a brake drum attached to the wheel, a brake lining surrounding substantially the entire circumferential peripheral surface of said brake drum and force generating means connected to said brake lining for providing a force acting on the entire surface of said brake lining to retard rotation of each wheel.

4 Claims, 4 Drawing Figures

INVALID WALKER WITH IMPROVED BRAKE MEANS

BACKGROUND OF THE INVENTION

The present invention relates to invalid walkers and more particularly relates to such walkers having an improved wheel retarding mechanism for better control and stability.

Walker devices to assist semi-ambulatory persons in achieving mobility are of extreme importance for permitting invalids to obtain self-sufficiency. Such walkers require wheels for securing the desired mobility of the device. It is of extreme importance that the walkers have stability, be relatively easy to steer, stop and retain in a stationary position. The foregoing desirable attributes can all be obtained through a reliable brake or retarding mechanism for the wheels of the walker.

Heretofore, the brakes employed with walkers most often included springs, ratchets, snap locks and other constantly moving parts which wore rapidly, thereby reducing the reliability of operation of the walkers. As may be readily recognized, any failure of the brake system of the walker might place the invalid employing such walker in an extremely perilous situation. Accordingly, it is essential that the brake for the walker be reliable during use for a prolonged period of time and, in addition, operate without necessitating the invalid to engage any mechanisms.

In U.S. Pat. No. 3,279,567 there is disclosed an example of a brake mechanism for an invalid walker. The brake mechanism therein disclosed requires the user of the walker to apply a pressure through the device's handles to engage the brake. The brake further utilizes a spring to move the brake shoe from engagement with the wheel. The brake shoe only engages the wheel about a relatively small sector of the wheel's peripheral circumferential surface. Only the rear wheels of the walker have a brake.

In U.S. Pat. No. 257,185 there is disclosed a baby walker having a brake for the front wheel. Each side of the wheel's hub is clasped between front portions of the walker's frame. A bolt provides means for varying the frictional force produced between the hub and frame portions. Thus, the brake force is only applied to a relatively small area of the hub's surface, with the brake force being generated through a pinching action on the sides of the hub.

SUMMARY OF THE INVENTION

It is accordingly an object of the invention to achieve a reliable and stable invalid walker.

It is a further object of the invention to improve the brake for an invalid walker.

It is yet another object of the invention to have a brake for each wheel of an invalid walker.

It is still another object of the invention to provide a brake for each wheel of an invalid walker having a braking force operable about substantially the entire circumferential peripheral surface of the wheel.

These and other objects of the present invention are achieved in an invalid walker including a frame having a plurality of support points, with each support point having a wheel connected to each wheel and includes a brake drum attached to the wheel, a brake lining surrounding substantially the entire circumferential peripheral surface of the brake drum and force generating means connected to said brake lining for providing a force acting on the entire surface of said brake lining to retard rotation of each wheel.

DETAILED DESCRIPTION OF THE PREFERRED EMBODIMENT

Figure 1:
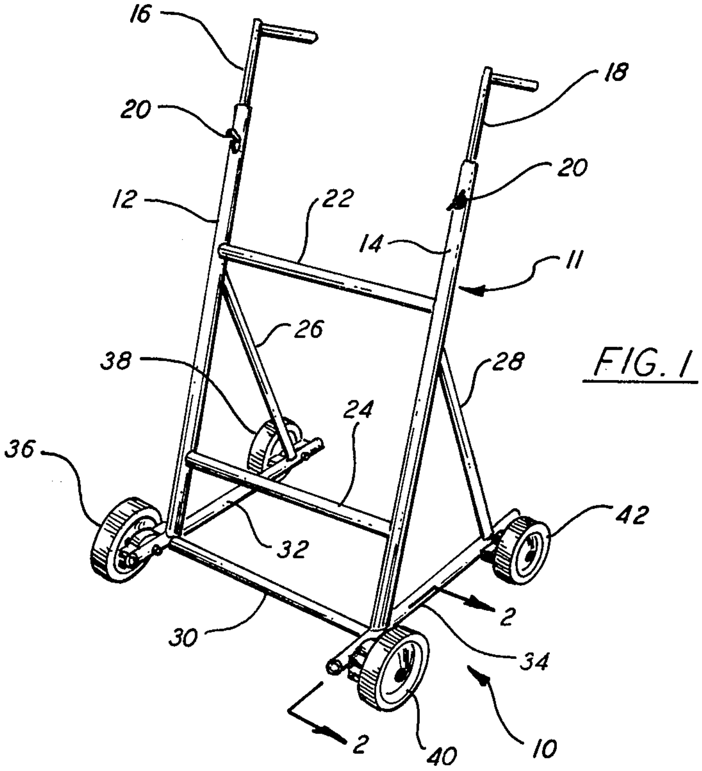
FIG. 1 is a perspective view of an invalid walker including the brake device of the present invention.

Referring now to the drawing, there is disclosed a preferred embodiment of the present invention. In referring to the various figures, like numerals shall refer to like parts.

FIG. 1 illustrates a perspective view of a walker 10 employed to assist an invalid in achieving locomotion. Walker 10 includes a frame 11 having elongated or upstanding arms 12 and 14. Arms 12 and 14 have movable members 16 and 18 telescopically mounted therein. The height of members 16 and 18 can be adjusted depending upon the individual requirements of the person employing the walker. Once members 16 and 18 have been properly positioned, they are secured in place by suitable means, as for example set screws 20.

Frame 11 further includes horizontal or cross supports 22, 24 and 30 and support struts 26, 28. Supports 22, 24 and 30 and support struts 26, 28 provide requisite structural strength to the walker.

Frame 11 also includes carriage members 32, 34. Members 32 and 34 are provided in parallel spaced relationship and are secured to the lower ends of arms 12, 14 and support struts 26, 28. Support 30 extends between the front end of each carriage member, with the end of the support being secured by suitable means, as for example welding to a carriage member.

Figure 2:
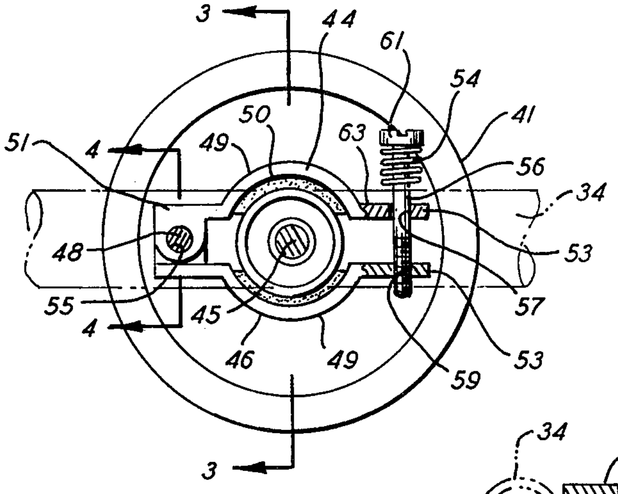
FIG. 2 is a sectional view taken along line 2—2 of FIG. 1, showing details of the instant invention.
Figure 3:
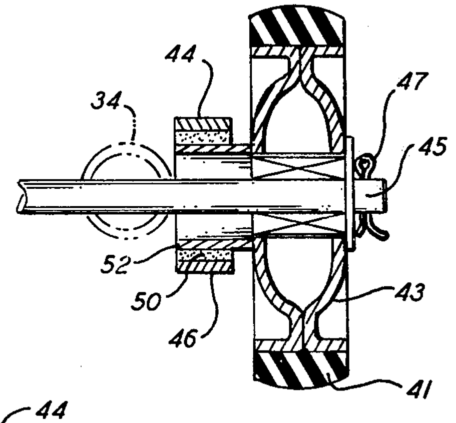
FIG. 3 is a sectional view taken along line 3—3 of FIG. 2 illustrating further details of the invention.

Wheels 36, 38, 40 and 42 are attached to carriage members 32 and 34 via suitable axles 45 (shown in FIGS. 2 and 3). Cotter pins 47 or other suitable means are employed to secure the wheels on the axles. Each wheel includes a hub portion 43 surrounded by an elastomeric member 41. Wheels 36 and 38 are attached respectively to the front and rear of carriage member 32 and wheels 40 and 42 are attached respectively to the front and rear of carriage member 34. The wheels are utilized to provide mobility for walker 10. Preferably, wheels 36, 38, 40 and 42 are equally spaced about carriage members 32 and 34 to achieve maximum stability for the walker.

Figure 4:
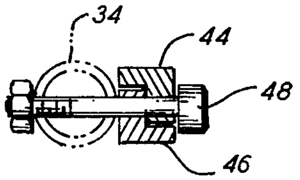
FIG. 4 is a sectional view taken along line 4—4 of FIG. 2.

As has been previously noted, it is extremely important due to the function of walker 10 that the walker have a reliable brake or wheel retarding mechanism. Referring particularly to FIGS. 2-4, the brake mechanism of the present invention shall now be explained.

Each wheel has a generally cylindrical brake drum 52 attached by suitable means, as for example welding, to the wheel's hub portion 43. Surrounding each brake drum in spaced circumferential relation thereto are a pair of band members 44, 46. Each band includes a semi-circular section 49, with each end of each band terminating in generally planar sections 51, 53. One planar section, for example section 51, of each band member includes a hole 55. Holes 55 are provided to permit each band to be secured on a screw 48. Screw 48 is attached to a carriage member and functions as a pivot point about which each band member rotates.

Sandwiched between the outer surface of brake drum 52 and the inner surface of each semi-circular section 49 of each band member is a material defining a brake lining 50. The material is preferably an elastomeric having suitable qualities to achieve a prolonged operational life for the lining. The brake lining is secured to the inner surface of sections 49 of band members 44, 46 and surrounds substantially the entire circumferential peripheral surface of drum 52.

The other planar section 53 of each band member includes a hole 57, 59. Hole 59 is preferably tapped to receive the threaded end of an adjusting screw 56. A compression spring 54 is secured between head 61 of screw 56 and the top surface 63 of planar section 53. Spring 54 urges the upper band member towards the lower band member, thereby placing a compressive force on the brake lining sandwiched between the band members and brake drum 52. The combination of the band members 44, 46 and compression spring 54 define uniform force generating means about the entire surface of brake lining 50. In effect, spring 54 tends to rotate the upper band member clockwise about screw 48, to obtain the desired force on brake lining 50.

Initially, the force on compression spring 54 is adjusted by tightening or loosening screw 56. In effect, by adjusting the force on compression spring 54, the brake force on the wheel can be controlled. Since each wheel has its own brake, the brake force on each wheel can be individually regulated. This is of great benefit since a walker employing the novel wheel retarding mechanism of the present invention can be matched to the actual needs of the handicapped person employing same. As may be readily recognized, a smaller brake force will be required for a relatively stable invalid when compared to the brake force required to control the mobility of a walker employed by a relatively severely handicapped person. In addition, if the health of the handicapped person should improve, the brake force can be changed by a relatively simple adjustment of one or more of the screws 56.

As brake lining 50 wears as a result of use of the walker, spring 54 urges the band members 44, 46 toward each other, thereby maintaining the pre-adjusted pressure on the brake lining and thus the brake drum.

The present brake or wheel retarding mechanism does not require the user to exert any physical effort to engage the brake and in addition, eliminates constantly moving parts such as clutches, ratchets, release mechanisms and control rods, thereby increasing the reliability of the walker. Furthermore, the brake force is applied to a relatively large area of the brake lining and drum to reduce the wear and prolong the operating life of the wheel retarding mechanism.

While a preferred embodiment of the present invention has been described and illustrated, the invention should not be limited thereto, but may be otherwise embodied within the scope of the following claims.

I claim:

1. A walker device for assisting an invalid comprising a substantially upright portion and a carriage portion, means to mutually support said upright portion and said carriage portion, a plurality of wheel means, said wheel means spaced to stablely support said walker, brake means, said brake means including brake drum means, said brake drum means operatively associated with each said wheel means, said brake means including brake band means, said brake band means including a brake lining, said brake band means and brake lining adapted to substantially surround said brake drum means, spring tensioning means, said spring tensioning means being resilient and adapted to continuously tension said brake band means with said brake lining in contact with said brake drum means allowing slippage whereby said walker may move with said brakes on, and individual means to adjust each said spring tensioning means whereby said walker may be adjusted to the needs of an individual.

2. The invention of claim 1 wherein said walker includes at least four wheel means.

3. The invention of claim 1 wherein said brake lining is substantially elastomeric.

4. The invention of claim 1 wherein said brake means comprises two hinged portions.

* * * * *